United States Patent [19]

Akiyama et al.

[11] Patent Number: 5,715,421
[45] Date of Patent: Feb. 3, 1998

[54] APPARATUS AND METHOD OF ADDRESSING PAGED MODE MEMORY INCLUDING ADJACENT PAGE PRECHARGING

[75] Inventors: James Edwin Akiyama, Beaverton, Oreg.; Daniel Paul Wilde, Redwing, Minn.

[73] Assignee: Seiko Epson Corporation, Tokyo, Japan

[21] Appl. No.: 962,438

[22] Filed: Oct. 16, 1992

[51] Int. Cl.$^6$ .................................................. G06F 12/02
[52] U.S. Cl. ................... 395/421.03; 395/411; 365/203
[58] Field of Search .................. 395/425, 400, 395/464, 481, 494, 404, 414, 411, 421.03, 421.08, 550, 421.09, 421.07; 365/230.03, 233.5, 203, 189.01, 233, 230.04, 189.05, 238.5

[56] References Cited

U.S. PATENT DOCUMENTS

| | | | |
|---|---|---|---|
| 3,768,080 | 10/1973 | Boger et al. | 395/400 |
| 3,976,892 | 8/1976 | Buchanan | 395/421.03 |
| 4,546,451 | 10/1985 | Bruce | 395/166 |
| 4,586,130 | 4/1986 | Butts et al. | 395/375 |
| 4,797,817 | 1/1989 | Nguyen et al. | 395/166 |
| 4,847,758 | 7/1989 | Olson et al. | 395/425 |
| 4,926,385 | 5/1990 | Fujishima et al. | 365/230.03 |
| 4,980,823 | 12/1990 | Liu | 395/463 |
| 4,984,209 | 1/1991 | Rajaram et al. | 365/222 |
| 4,991,112 | 2/1991 | Callemyn | 364/518 |
| 5,007,011 | 4/1991 | Marayama | 395/421.03 |
| 5,072,420 | 12/1991 | Conley et al. | 395/425 |
| 5,093,777 | 3/1992 | Ryan | 395/403 |
| 5,214,610 | 5/1993 | Houston | 365/233.5 |
| 5,269,010 | 12/1993 | MacDonald | 395/425 |
| 5,278,963 | 1/1994 | Hattersley et al. | 395/421.03 |
| 5,285,421 | 2/1994 | Young et al. | 365/230.04 |
| 5,367,656 | 11/1994 | Ryan | 395/403 |
| 5,371,870 | 12/1994 | Goodwin et al. | 395/414 |
| 5,434,990 | 7/1995 | Moussavi et al. | 395/421.08 |
| 5,450,561 | 9/1995 | Ryan | 395/403 |
| 5,485,589 | 1/1996 | Kocis et al. | 395/421.03 |

FOREIGN PATENT DOCUMENTS

| | | |
|---|---|---|
| 99996 | 5/1986 | Japan . |
| 149099 | 7/1987 | Japan . |
| 164096 | 7/1988 | Japan . |
| 21790 | 1/1989 | Japan . |
| 59692 | 3/1989 | Japan . |

*Primary Examiner*—Eddie P. Chan
*Assistant Examiner*—Hiep T. Nguyen

[57] ABSTRACT

An intuitive precharge sequencing technique for improving memory access through elimination of delay time incurred through precharging during page mode access of DRAM type memory. Current and prior page address access request information is used to generate a prediction as to whether the next address request will cross a page boundary and, therefore, require precharging of a new page. The predicted new page is then precharged before access is requested. Further advantages are obtained by providing an enable/disable feature, which allows either software or hardware to initiate or deactivate the operation of the precharge request in association with current or historical operating characteristics for a particular processor or program tasks. Where desired or practical, multiple levels of predictive analysis are used to refine the accuracy of trend predictions.

19 Claims, 5 Drawing Sheets

APPARATUS AND METHOD OF ADDRESSING PAGED MODE MEMORY INCLUDING ADJACENT PAGE PRECHARGING

BACKGROUND OF THE INVENTION

1. Field of the Invention

The present invention relates to computer type memory access and more particularly to a system for page mode memory access using DRAM-type memory elements, in which memory pages are precharged before actual processor requests. The invention further relates to a method and apparatus for predicting trends in page access requests by a processor and for using such trends as criteria for preselecting and precharging pages prior to being requested.

2. Related Technology

Some important considerations for computer users, especially of the personal desktop variety, are overall cost, upgrade costs, and operating speed. Aside from the initial design and production expenses, and certain hardware elements, computer costs are heavily influenced by the cost of the central processor unit (CPU) employed and the amount and type of memory, which also affects upgrade costs in terms of additional memory.

The type of memory used, SRAM or DRAM more typically, directly impacts cost since SRAM memory is much more expensive than DRAM memory which is the product of a very mature technology. The memory cost can also be influenced by the particular memory schemes used including the use of advanced cache techniques and controllers often employed to increase data throughput speed. Unfortunately, high speed cache usually requires the use of the more expensive SRAM devices. In addition, to direct component cost, memory elements may also vary in terms of the cost of required support components, etc. Therefore, it is desirable to avoid the use of specialized or very high speed components where possible.

At the same time, newer CPUs operate at higher speeds placing increased demands on current memory addressing techniques. High speed memory access may be impaired or experience time delays when using current access architectures or schemes. One source of this delay is the page charging or precharging operation required for accessing any given page of DRAM memory, where a page commonly refers to the access of one "row" in a bank of memory on one or more integrated circuit chips. For DRAM type memory elements, each page, or row, access request starts a charging process for the desired page which must be charged before data can be retrieved, often referred to as precharging or recharging. However, this charging can take as long as 50–70 nanoseconds to accomplish, depending on the system and memory elements used, while the processor is capable of accessing individual memory addresses at higher speeds of about 7–15 nanoseconds, or less. These higher speeds are used for accessing individual page entries or columns in a row. That is, while column or data-on-page access is fast, new page or row access is greatly limited by the required length of a precharge cycle. In some systems it has been shown that up to half of the access time for a memory location can be attributed to the pre-charging time.

In order to overcome this limitation, CPUs and memory controllers are often configured to access data in sequential blocks or bursts. One such sequential technique, accesses several adjacent pages at the same time, once a single page access occurs. This utilizes charging for several rows to achieve quicker access for a given page when the data is needed. Even if pre-charging occurs sequentially in burst mode, it takes place during the time interval data is being read, that is, while data is transferred from each column along a row of memory, in a single adjacent page, and takes advantage of intra-row access delay time. Unfortunately, this approach assumes that a large percentage of the data is in adjacent rows which in fact may not be true and could waste time in charging the wrong rows or pages.

One refinement to the simple sequential address technique is to use the currently selected memory address to provide an indication of page boundaries. If the currently accessed address is the highest or maximum memory location for the page being accessed, then the next page is precharged for selection. This is accomplished, for example in an 18-bit address scheme, by looking for high order address values on the order of FFFFFFFF (hexadecimal) which occur only in the last location, top, of a page. Unfortunately, this approach has at least two major drawbacks.

First, several types of programs use memory addressing schemes in which data is retrieved in a last in first out (LIFO) manner. Programs using compression algorithms, such as the Lempl-Ziv algorithm or those such as the one known as the PKZIP® compression program, use reverse incrementing or decrementing to achieve a desired LIFO operation or memory structure. In addition, advanced video programs such as TARGA® graphics programs may store data using the physical maximum page of memory for the first (upper) scan line of system video output, which is the reverse of normal. In all of these cases, memory access requests are decremented a page at a time to arrive at the proper output data. In these situations, the CPU decrements memory address request locations a significant amount of the time. Therefore, the FFFFFFFF or high address value boundary condition is met frequently, but the direction of the memory request sequence is toward a lower address location on the same page and not toward a higher page.

These types of programs generate access requests that are disadvantageous to sequential access schemes. Automatic sequencing to the next page in this programming environment seriously penalizes the CPU. The assumption that address requests for the top memory location FFFFFFFF mean that the next page up in sequence is to be selected, is not only invalid but potentially problematic. If the sequence is assumed to increment, there is a gross mismatch between the precharging sequence and the next CPU request at page boundaries. This mismatch manifests itself as requesting and, therefore, refreshing the wrong page. This in effect penalizes the CPU for these types of activities and may outweigh any gains for other programs or tasks executed by the CPU, etc.

A second problem arises from highly randomized memory access requests. If the program tasks being executed by the CPU utilize a significant number of calls and jumps, a boundary mismatch is more likely to occur for the above sequential techniques. Again, an incorrect, next upper, page is precharged when the CPU moves selectively, non-sequentially, across many page addresses. While this type of program environment may indicate a lack of optimization, it also reflects a significant portion of "built-up" and "patched" programs which find use in consumer markets. Current schemes do little to improve timing delays for these programs.

Advanced CPUs can solve part of the problem by using advanced features such as a flag bit to indicate a direction of passage through memory. Such a flag bit can be used to quickly set memory access request processing to traverse memory using continuously lower page and data positions. This removes the burden of computing decremented addresses in the usual fashion. The so called "reverse direction" flag could also be used by a memory manager to deactivate upward sequence based precharging where appropriate. However, this does not solve the problem for all programs or processors, and in fact fails to address the basic issue of recognizing boundary excursions in multiple and dynamically changing directions.

What is desired is a new method and apparatus for addressing memory that allows improved access time for advanced CPU's while avoiding the above and other problems associated with sequential charging or refreshing of page mode memory. It is also desirable that a minimum of complexity and cost be involved for implementing the memory access request scheme.

SUMMARY OF THE INVENTION

In view of the above problems in the art, one purpose of the invention is to provide a technique for precharging memory pages prior to the time when access is requested.

Another purpose of the invention is to predict the occurrence of memory accesses near or across page boundaries so that adjacent pages are ready for access when needed without a precharging delay.

An advantage of the invention is that the speed of memory access is substantially maintained, or improved, when crossing page boundaries.

Another advantage of the invention is that overall memory access speed is enhanced without great cost.

Another purpose of the invention is to provide a mechanism for flexible control over memory access including deactivation of boundary prediction processing so that optimum performance can be maintained for a variety of programming environments.

These and other purposes, objects, and advantages are achieved in a page mode DRAM sequential memory access method and apparatus where a current and at least one previous access request address are used to generate a prediction as to whether or not a next address request will cross a page boundary necessitating precharging of a new page. A page refresh cycle is commenced for the predicted new page so that it is precharged before access is requested.

Page mode memory access requests from a memory address bus are observed to determine when at least one preselected memory location relative to a page boundary is requested. The next consecutive memory access request is then observed to determine if a memory location closer to a page boundary is being requested. If the second request is closer to the page boundary, then a potential page boundary crossing condition is declared and precharging of the adjacent page, in the direction of potential crossing, is requested. If the second memory access request is not closer to the page boundary, then no precharging of an adjacent page is requested, and subsequent memory access requests are observed to see if they again meet the first preselected boundary location criteria.

In a preferred embodiment, the method and apparatus of the invention tests to see if memory access requests are progressing toward an upper page boundary, creating a potential overflow condition, or toward a lower page boundary, creating a potential underflow condition. In this operational mode, memory access requests from the memory address bus are observed to determine when a next highest or next lowest memory location on a page are requested. Such a request is established as a potential overflow or underflow condition, respectively. The next memory access request is then observed to see if the lowest or highest, respectively, page locations are requested. If the second request is closer to the page boundary, either highest or lowest address on page, a potential overflow or underflow condition is predicted and the next higher or lower page, as appropriate is precharged. Otherwise, the next memory access request is again observed to determine if the initial preselected memory locations, next-highest or next-lowest, are being requested. When a potential overflow or underflow condition or state is predicted, the current address value being used by a memory controller is typically incremented or decremented by one to select the next adjacent page in memory for precharging.

In a preferred embodiment, this technique is accomplished by inputting all but the least significant bits of the memory access request commands for a page to a set of logic gates, preferably configured as a parallel set of AND and NOR gates, whose outputs are 1 and 0, respectively, only when either the two highest or lowest address locations on a page are requested. That is, only when the most significant bits are either all 1's or all 0's. At the same time, the lowest order bits, which specify one of two memory locations adjacent to page boundaries or borders, are provided as first inputs for another set of logic gates, generally a two-input XOR gate and a two-input XNOR gate, which each also receive a mode setting input as a second input. The output from the first set of gates indicates when the request is not near a page boundary, while the output of the second set of logic gates indicates which location near a page boundary is being requested.

The outputs from the first and second sets of logic gates are combined in a third set of combinatorial logic elements whose outputs are applied to one or more state machines. The state machine or machines adopt a given state based on the relative closeness of memory accesses to page boundaries. In the exemplary embodiment, only five states are needed, one for an idle state where no access request is near a boundary, two for accesses near a lower page boundary (underflow), and two for accesses near an upper page boundary (overflow). The output of the state machine indicates to memory control circuitry when a page boundary crossing is being predicted and in which direction the next pre-charge cycle should be directed.

When using the preferred AND/NOR and XOR/XNOR logic elements, the second inputs of the XOR and XNOR gates are set low or to 0 when the system is in an initial or idle state. In this state, an input of 1 generates an output of 1 for the XOR gate and an output of 0 from the XNOR gate, while the inverse is true for an input of 0. The output of the XOR gate is combined in a second AND gate with the output from the NOR gate or gates to generate a 1 output only when the next lowest page location is requested, while the output of the XNOR gate is combined in a third AND gate with the output from the first AND gate or gates to generate a 1 output only when the next highest page location is requested. Therefore, the outputs of these gates indicate when the initial selection criteria of page location requests near page boundaries occur.

As discussed, at least one state machine is connected to the outputs of the XOR and XNOR gates and the second and third AND gates. The state machine responds to the indication from these gates that a preselected memory access near a page boundary has occurred by setting the XOR and XNOR gates in an overflow or underflow mode or state. This is accomplished by resetting the second gate inputs to 1. In this mode, only the presence of a memory access request closer to the page boundary will generate a 1 output from the second or third AND gates. The output of the second AND gate is 1 when the next memory access request is for the lowest page location and the output of the third AND gate is 1 when it is for the highest page location. However, any other memory request generates a 0 output from the AND gates and the state machine resets the XOR and XNOR gates to an idle state to start the process again. Therefore, only consecutive memory access requests that proceed closer to a page boundary, commencing from a preselected location, provide a valid output at this point, and any other pattern resets the apparatus so the process starts over at the beginning.

When a subsequent memory access is determined to be closer to a page boundary, a next higher or lower page indication signal is generated by the state machine. This signal is used to indicate to memory control hardware or a CPU or similar processor that a next upper or lower, as appropriate, page should be precharged. In the preferred embodiment, this is accomplished by using a memory request add/sub strobe and an adder/subtractor element connected to the memory address bus. The adder/subtractor element adds or subtracts a value of 1 from the current page request value on the address bus, or in an appropriate latch. That is, the adder/subtractor element either increments or decrements page requests to request the next page. The add/sub strobe provides an indication from the state machine as to whether the adder/subtractor element should add or subtract the value of 1 to retrieve the adjacent page.

In further aspects of the invention, it is preferred to provide separate state machines for overflow and underflow prediction which are connected to the XOR and XNOR gates, respectively. In addition a third state machine is generally provided which receives the output from the first two state machines and is in communication with processor and memory control hardware. This state machine assures that page requests for precharging do not occur while other such requests are still pending or do not otherwise interfere with desired operations for the CPU. This includes the ability to prevent page precharging where an advanced type of CPU is using certain types of burst read mode or the like page accesses.

The present invention provides an "intuitive" technique for improving effective memory access speed through elimination of delay time otherwise incurred in crossing page boundaries and precharging pages during page mode access of DRAM type memory. The invention also offers a technique for decreasing processor wait time for charging pages when using burst mode type memory access.

In another embodiment, the DRAM memory is subdivided as up to "n" banks of memory and data is stored sequentially across the banks. That is, data value X is stored in bank 1, while data X+1 is stored in bank 2, and X+2 in bank 3, and so forth up to the n bank limit before returning to the first bank. Appropriate bank control circuitry is connected to the page (row) and column (location) address lines to translate the overall memory addresses into the subdivided individual bank addresses as required. At least two banks are used in the DRAM structure (n=2), with four (n=4) providing certain preferred advantages, and the banks are each designated as "even" or "odd". Each time an odd bank is requested, an even bank is charged, and visa versa, resulting in the effective memory access speed for the processor being increased by a factor slightly less than n because precharging delays for sequential data access are eliminated.

Additional advantages over the art are obtained by providing an enable/disable feature, which allows either software or hardware to initiate or deactivate the operation of the invention in association with current or historical operating characteristics for the particular processor and program tasks. Where desired or practical, multiple levels of predictive analysis can be used to refine the accuracy of trend predictions.

BRIEF DESCRIPTION OF THE DRAWINGS

The invention can be better understood from a review of the accompanying drawings which illustrate embodiments and details of the invention, in which like numbers are used to refer to like parts and in which.

DETAILED DESCRIPTION OF PREFERRED EMBODIMENTS

The present invention provides a technique for improving memory access through elimination of a certain amount of delay time incurred through precharging during page mode access of DRAM type memory. The invention uses page mode access information from the memory bus to formulate a prediction of future memory accesses and prepare pages for accessing prior to actual processor requests. That is, current and prior page address request information is used to generate a prediction as to whether the next address request will cross a page boundary and, therefore, require precharging of a new page. The predicted new page is then precharged before access is requested. The invention provides an "intuitive" precharge sequencer that reduces wait time normally associated with crossing page boundaries and having to implement a page, row, precharge (RAS) cycle. Where desired or practical, multiple levels of predictive analysis are used to refine the accuracy of trend predictions. At the same time, if the memory is configured as a series of odd and even interleaved banks, burst mode and fixed sequential type accesses can be accommodated quicker by pre-charging adjacent banks. Further advantages are obtained by providing an enable/disable feature, which allows either software or hardware to initiate or deactivate the operation of the invention in association with current or historical operating characteristics for a particular processor or program tasks.

The invention is used in association with a page mode memory access scheme for DRAM type memory. As mentioned above, DRAM memory enjoys widespread use in the computer arts for personal and small business computers due to its lower cost, availability, and ease of use. A brief overview of a portion of a typical page mode memory access system is illustrated in FIG. 1.

Figure 1:
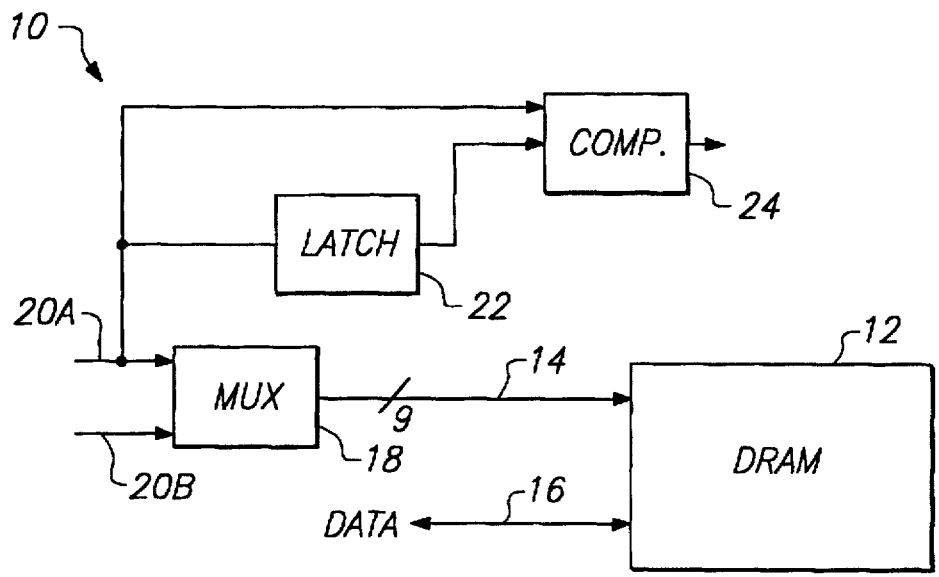
FIG. 1 illustrates a portion of a page mode DRAM type memory access system.

In FIG. 1, a page mode memory system 10 is shown using a DRAM element or structure 12 which is connected by appropriate inputs to a data bus 16 either from which data is read (processor write) or to which it is written (processor read). DRAM 12 is also connected to an address bus 14 over which memory addresses are provided for data read/write operations. As will be clear to those skilled in the art, other input/output lines for power, clock, enablement, etc., are commonly used for controlling the DRAM 12 but are not shown here for purposes of clarity.

DRAM 12 is typically a 256 kilobit or 1 megabit sized structure although other sizes may be used, especially as memory technology progresses to larger memory densities. The overall construction of the DRAM structure provides a two-dimensional array of memory locations having row and column designations. In page mode operation, each row of addresses is typically referred to as a page of memory which contains several locations each of which corresponds to a column position. As known in the art, each location is accessed using at least one row address strobe (RAS) signal and a column address strobe signal (CAS). Therefore, each page is selected by a RAS signal and the locations on the page by a CAS signal. The circuitry used in the art for decoding addresses into RAS and CAS signals and for controlling these signals and connecting them to appropriate DRAM circuit elements, as well as memory element sensors and amplifiers for reading data, etc. are not illustrated here for purposes of clarity.

Current DRAMs are typically constructed with a 9-bit wide address input bus. Therefore, to address the entire structure, address requests or instructions issued by a central processor unit (CPU) or other processing element using external memory (not shown) use a multiplexer 18 to first provide a page (row) address and then a data position (column) address value. Assuming an 18-bit wide address instruction scheme, which differs according to specific applications as known in the art, the upper bits (17-9, or 18-10) specify the page (row in RAM) and the lower bits (8-0 or 9-1) are used to specify data locations on the page, columns where data is located. In an exemplary configuration, the address bits are provided to the multiplexer 18 over two separate address busses 20A and 20B, although a variety of known techniques can be implemented to use a single 18-bit or larger bus and appropriate timing control to provide the narrower bit-width output for DRAM 12.

As shown in FIG. 1, a latch 22 is connected to the page address bus 20A and is configured to receive and hold data or information transferred on address bus 20A (here bits 17-9) which indicates the current page requested by a processor or CPU. Latch 20 may also be configured to receive only the desired bits from a single wider address bus as desired. As an alternative, using appropriate cycle timing, latch 20 can receive the page request information by monitoring the narrow output address request bus 14 and latching bits during that portion of the memory address cycle used to select a page address. However, this is more complicated in some apparatus and considered a less preferred approach. In any case, at any time, the page request address information, in the form of a series of bits, for the currently requested page (desired RAS) is latched into or held by latch 22. Latch 22 holds the latest page request information until a new page is requested.

One input of a comparator 24 is also connected to address bus 20A, or 14 where appropriate, to read or detect the current page being requested by the CPU. A second comparator input is connected to an output of latch 22. This provides comparator 24 with both the previous and current page requests or addresses requested to see if they are the same. If these addresses or address values are the same, comparator 24 indicates an equality of the two inputs. When the comparator inputs are the same, this condition is considered a "hit" or "page hit" which simply means that the processor has requested the same page twice sequentially or consecutively. Therefore, the page being selected is already charged or precharged and there is no time delay penalty for the "new" page request.

While the current and previous page request information could be used to simply increment the page charging for a group of pages in one direction, as previously stated, this technique does not work well. If the wrong page is precharged then at least two RAS and one CAS cycle must be used to reach the correct page, one RAS for the wrong page and one for the right page. This causes delay as the processor waits for memory access. Instead, in the present invention, "historical" page access request information is used to generate an "intuitive" or "intuition-like" prediction of which direction CPU or other processor access requests are likely to proceed in the region of page boundaries. Once a prediction is established, adjacent pages located along a path through memory which the processor has exhibited a tendency to traverse or access, are precharged as the page boundary is approached.

In its simplest form, the method of the present invention operates by determining if the memory location specified by an access request falls within a predefined distance from a page boundary, either upper or lower. For those access requests meeting this first criteria the next access request is also checked to see if it is closer to the same boundary than the previous request. If the second request is the same or farther from the page boundary the two requests are ignored and the process starts over. If, on the other hand, the second access request is closer to the boundary than the first, or at the boundary, a prediction is made that a new page will be required by a subsequent access request. If a page boundary is being approached, regardless of from what direction, either decrementing or incrementing addresses, then the next page along the same access request path is precharged to be ready for access. Generally, a precharge cycle is not started or requested unless a second, or so forth, observed access request has reached the boundary of the page.

Figure 2:
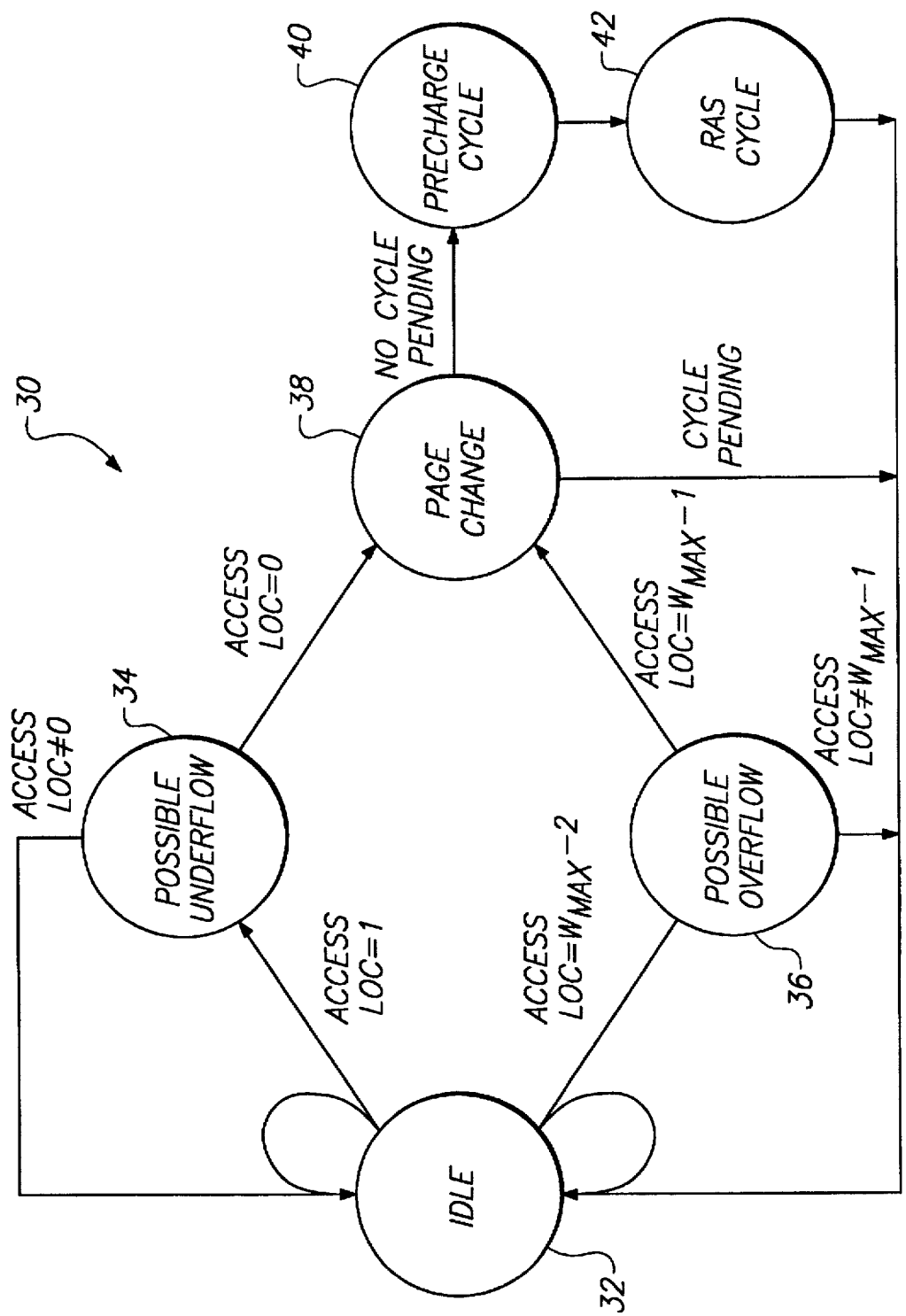
FIG. 2 illustrates a state diagram useful for implementing the operations of the present invention.

The implementation of the invention is illustrated in state diagram form in FIG. 2. In FIG. 2, a sequential memory address system 30 rests in an initial state 32 which is defined as an "idle" state in which address access requests are observed or monitored to detect when any request is directed to a location near a page boundary. This is accomplished by recognizing that on, or in, a page (P) of memory (row in RAM) there is a certain or maximum number of preset data locations (columns) available for access, here labeled $W_{max}$ for convenience. The individual locations on a page then range from 0 to $W_{max}-1$ (or 1 to $W_{max}$). The lowest data segment on a page is at position zero and decrementing memory any further requires going to a lower page, while $W_{max}-1$ represents the top of the page and requires going to another page when the next data request is incremented (such as in a sequence). In other words, the locations 0 and $W_{max}-1$ on a page form or define the page boundaries.

In the preferred embodiment, processor memory access requests are monitored or observed to determine if they occur within one memory access location of a boundary. As discussed below, other locations can be employed where desired, but the once removed locations prove to be very useful guides for most applications. Therefore, being close to a page boundary translates to mean those locations labeled 1 and $W_{max}-2$ for the upper and lower page limits, respectively. As shown in FIG. 2, if an address or memory access request occurs for any location other than 1 or $W_{max}-2$, then memory advancement system 30 remains in the idle state. Otherwise, when 1 or $W_{max}-2$ are specified as the request or access location, one of two new states is selected.

If the access request is for location 1, then a potential "underflow" condition exists, in which a lower memory page (P−1) could be required and system 30 enters an underflow state 34 in which system 30 predicts whether or not the next lower page will be needed. If, however, $W_{max}-2$ is the access location being specified, a potential "overflow" may occur and an overflow state 36 is entered for predicting whether or not the next higher page (P+1) will be needed. In FIG. 2., the transitions to states 34 and 36 from idle state 32 are each specified by corresponding memory access locations. Restated, either of states 34 or 36 represent an initial prediction by the memory address system 30 that the next data request could exceed a page boundary.

Once either of states 34 or 36 are entered, another test is performed before an overflow or underflow condition is finally predicted. The principle test for predicting whether or not a boundary is going to be exceeded is whether there is a trend in memory access request locations toward a page boundary. In other words, is the next (current) access request closer than the previous request, from state 32? In the preferred embodiment, this inquiry means, is the current memory access location being observed when the system is in state 34 "0" or some other value; and when the system is in state 36 is it "$W_{max}-1$" or some other value? Has the memory access location being requested moved toward the boundary as initially predicted in state 34 or 36?

Once the memory access system is in operating states 34 or 36, if non-boundary values are detected in the next access request, system 30 returns to idle state 32. This means that the processor has performed a jump, call, or other type of activity in which data in a different portion of memory is requested or required. However, if a boundary is detected in the next access request, while in states 34 or 36, access system 30 makes a transition to a page change state 38. In this new state, a next page is selected, one up or down from the current page being accessed, and one additional test is performed.

At this point, it is typically advisable to check to see if the processor has any other memory cycle pending. That is, has the processor already chosen a new page location as part of some burst read mode or other task switching mode which should be followed. In this type of situation, of which there are several known variations, precharging a page would create a potential time penalty. Therefore, if an access cycle is pending, system 30 returns to idle state 32. Otherwise, the address system makes a transition to a precharge cycle state 40 in which the predicted page is specified or designated as part of a refresh or recharge instruction to the DRAM control circuits. Finally, system 30 makes a transition to a "page cycle" or "row access cycle" (RAS) state in which the system waits for passage of the amount of time necessary to complete a page precharge, which depends on known application parameters. At the end of the required time, system 30 returns to idle state 32.

Therefore, unlike the current techniques where one memory location is used to initiate a sequence of page changes or precharging, the present invention looks for an actual, longer term, trend before making page selections for precharging. Furthermore, instead of assuming that the selection of a page boundary location necessarily means a page boundary will be crossed, the present invention establishes a more substantial criteria for predicting page boundary crossings. This new technique is also insensitive to the direction memory access requests are stepping in for sequential accesses, so that decrementing through memory does not create a penalty since the direction of change, up or down, is correctly detected. That is, the problem previously encountered with simply detecting the FFFFFFFF or other top page location does not occur here since two consecutive locations are required before a page boundary crossing is assumed and the direction of memory access is correctly interpreted.

The state diagram illustrated in FIG. 2 is based on using a comparison between two successive memory access requests. However, the teachings of the invention can be extended to using three or more successive requests as input criteria where sufficient computational power, circuit area, etc. can be provided to analyze the information, and where longer trends are desired before invoking the features of the invention. This may be applicable where it is known in advance that associated program processor is going to execute programs involving less random but non-sequential memory access requests. However, in the preferred embodiment two successive requests are considered to provide more than adequate data for the majority of the operations encountered for the computers of interest.

In the above technique, after the precharge information is forwarded for processor or memory controller use, the memory access system returns to an idle state and the process begins again. It is apparent from a review of this addressing system that excursions across page boundaries will not generate time delays previously associated with such excursions, or addressing schemes. However, if the processor addressing activity has a discontinuity such as a sudden change in direction for stepping through memory when requesting data, some delay will be incurred by precharging the wrong page. If on the other hand, additional memory access requests are used to predict a boundary crossing trend, even problems associated with somewhat random or sudden changes in memory accessing may be alleviated to a large degree. In addition, an overall success rate can be added as a feature or selection criteria which is used to enable or disable the operation of the predictive memory accessing system 30.

Figure 3:
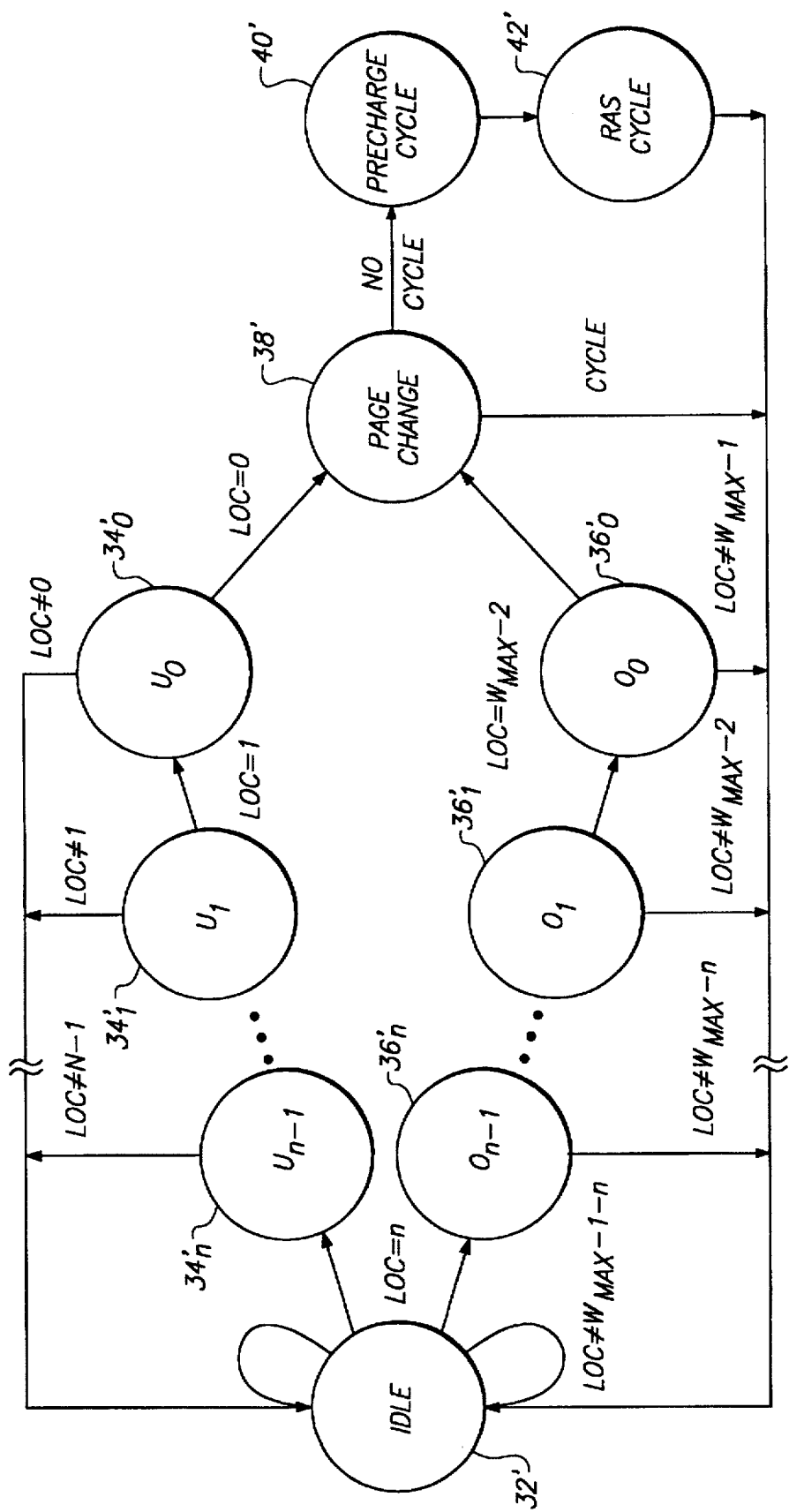
FIG. 3 illustrates a state diagram useful for extending the operation of the invention of FIG. 2 to additional predictive levels.

An extension of the inventive apparatus to additional predictive levels is illustrated in the state diagram illustrated in FIG. 3. In FIG. 3, a memory access system 30' uses an idle state 32' to designate the initial state for observing memory access requests. As before, the memory access locations being requested are observed to see if they fall within a predetermined location, distance, or step (column) from the page boundaries. If the location (column position) is chosen to be a value of n, then transitions occur to new states $34_0'$ and $36_0'$ for locations n and $W_{max}-1-n$, respectively. These transitions lead to new underflow and overflow states $34_1'$ and $36_1'$ in which system 30' determines whether or not the next access request is for locations n−1 and $W_{max}-n$, respectively. This process continues until the locations 0 and $W_{max}-1$ are accessed. The size of n naturally determines the total number of states possible under or overflow states 34' ($34_0'-34_n'$) and 36' ($36_0'-36_n'$) that are used. In each state, the option to return to idle state 32' is preserved as in the earlier example. In addition, once the final test for predicting either under or overflow, $34_n'$ or $36_n'$, has been reached, address system 30' proceeds to the page change 38', precharge cycle 40' and RAS cycle 42' states, as before.

It should be noted that in the state diagrams of both FIGS. 2 and 3, a memory access request having a page boundary location does not elicit further system response without previous requests having fit prescribed criteria. This avoids both the previously discussed errors and making changes which achieve minimal gains in performance.

The above state diagrams can be implemented using a variety of techniques and hardware typically know to those skilled in the art of computer or memory circuit design. An overview of an exemplary embodiment of the invention in relation to the previous page mode example of FIG. 1 is illustrated in FIG. 4.

Figure 4:
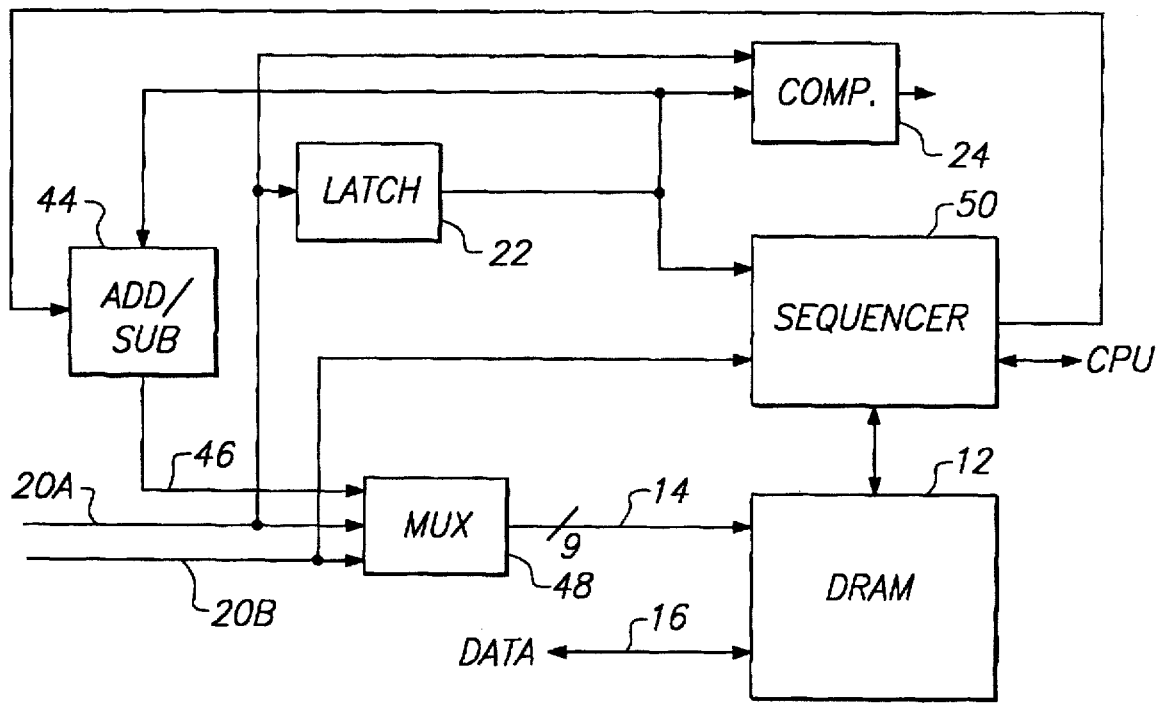
FIG. 4 illustrates an overview of one embodiment of apparatus useful for implementing the state diagram of FIG. 2.

In FIG. 4, a page mode memory system 100 is illustrated with DRAM 12 using data bus 16 to transfer data and bus 14 for receiving memory address access requests, as before. Latch 22 is connected to address bus 20A and is used in conjunction with comparator 24 to determine the current address page and whether or not there is a page hit. However, for purposes of the present invention, an adder/subtractor 44 is added as an input to a multiplexer 48, using a third input bus 46, which still processes address information for 9-bit wide address bus 14. In addition, a memory access monitor or sequencer 50 is provided for monitoring input bus 20B, or 14, and providing page change requests as outputs in response to the presence of consecutive memory access requests approaching a page boundary or border.

For the embodiment of FIG. 4, when a page boundary excursion or crossing is predicted, an appropriate page change is requested utilizing adder/subtractor 44 and multiplexer 48. Sequencer 50 essentially provides an output of one when either an overflow or underflow condition is predicted. By adding or subtracting one with the current address on bus 20A, or in latch 22, the output of multiplexer 48 is incremented or decremented to the appropriate next page (P±1). Sequencer 50 can be constructed to either provide a signed output of 1 or −1, or a selective instruction indicating whether an addition or subtraction operation is desired, to adder/subtractor 44. In either case, the operation of adder/subtractor 44 efficiently changes the value of the current address request by stepping it up or down, and a refresh or precharge process is begun on the next predicted page while new address information is awaited from the CPU or other processor. As long as the prediction is correct, the address request value residing on address bus 20A remains unchanged by the processor. That is, the same value is provided by the CPU so that no value change is perceived by DRAM 12. Only when the prediction is in error is a new value provided on bus 20A by the processor which must then wait for a precharge cycle before addressing additional memory.

Figure 5:
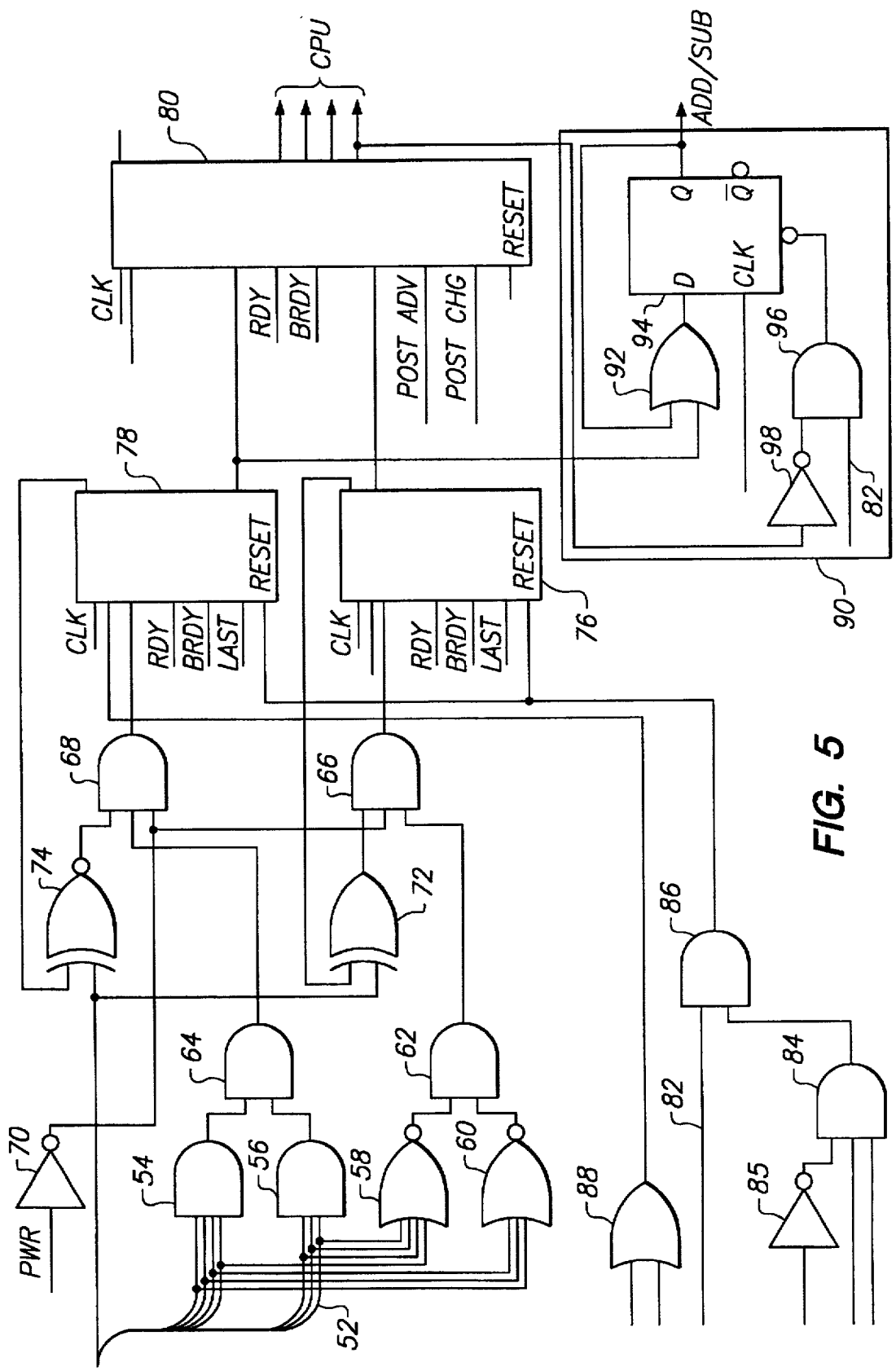
FIG. 5 illustrates a more detailed schematic of apparatus for implementing the embodiment of FIG. 4.

An exemplary apparatus for achieving the functions of sequencer 50, in cooperation with adder/subtractor 44, or implementing the states of FIG. 2, is illustrated in further detail in FIG. 5. In FIG. 5, a memory address access request sequencer 50 is shown using an 9-bit wide input bus 52 to transfer memory page access request signal bits. The illustrated structure is used to match the exemplary 9-bit DRAM address structure, but other bus widths and bit request patterns can be used within the teachings of the invention for specific applications as desired. The address request bits are received from bus 20B as shown in FIG. 4. Each of the bits used to request a location or address on a memory page is transferred on input bus 52 to a series of gates for distinguishing page boundary conditions.

The least significant bit (LSB) of the received address request is provided to both an exclusive OR gate and an exclusive NOR gate, discussed below. The seven (7) remaining higher order or most significant bits (MSB) are provided as inputs to two AND gates 54 and 56, and concurrently to two NOR gates 58 and 60. The two NOR gates provide underflow detection while AND gates 54 and 56 provide for overflow detection.

These operations are easily understood by observing that the lowest and next lowest address locations are designated as address values zero (0) and one (1), respectively, and they both provide input values of all 0's on the seven highest bits of the observed bus inputs. By using one 4-input and one 3-input NOR gate, a high output or one (1) is generated at the outputs of both gates when either of these address request values are reached. Any other address requests provide a 1 on one or more inputs for NOR gates 58 and 60, resulting in a low or 0 level on either one or both of the NOR gate outputs. That is, this configuration provides part of a lock-out or forced idle feature in which the rest of the circuit will not analyze the memory access request if it is outside of the prescribed region adjacent to the page boundary.

It will be clear to those skilled in the art that the exemplary NOR gates can be combined into a single gate structure for convenience. At the same time, fewer inputs may be employed for the NOR gates where more low order bits are used to analyze additional page locations, for example the lowest 4, in predicting page boundaries. The outputs from NOR gates 58 and 60 are each provided as inputs to a 2-input AND gate 62 which provides a single bit indication that one of the lowest two addresses on a page is being requested.

At the same time, AND gates 54 and 56 provide a similar function for memory access requests in the upper page boundary region where the seven highest order bits are all 1's. In this situation, the two AND gates provide a high level or 1 output when the highest two address locations on a page ($W_{max}-1$ and $W_{max}-2$) are requested. The output from AND gates 54 and 56 are provided as inputs for a two-input AND gate 64 which in turn provides a high level or 1 output when both AND gate inputs are 1. This provides a single bit indication that the current address request on bus 52 is for either the highest or second highest address positions on a page being requested.

As before, the exemplary AND gates can be combined into a single gate structure for convenience or fewer inputs may be employed for the gates where more low order bits are used with other portions of the apparatus to analyze additional page locations, for example the highest 4, in predicting page boundaries.

The single bit indicators for underflow and overflow are each used as an input to one of two three-input AND gates 66 and 68. The output of AND gate 62 is provided as an input to AND gate 66, and the output of AND gate 64 is provided to AND gate 68. One of the other two inputs for AND gates 66 and 68 is fixed at 1, a value that can be provided for example by inverting a voltage input for the circuit, using an inverter 70. This provides a convenient method of setting the AND gate outputs to zero when power is interrupted or reset. The remaining inputs of three-input AND gates 66 and 68 are the lowest order bit from the address access request on bus 52, after processing by exclusive OR (XOR) gate 72 and exclusive NOR (XNOR) gate 74.

XOR gate 72 provides a high or 1 output only when one of the two inputs is high level or 1 and XNOR gate 74 provides a low level or 0 output for the same input conditions. Any other combination of inputs (0,0 or 1,1) results in a 0 from XOR gate 72 and a 1 from XNOR gate 74. Using these logical operators, memory access system 50 distinguishes between the two lowest and highest memory address access requests. The second of the two-inputs for XOR gate 72 and XNOR gate 74 are set by state machines 76 and 78, respectively, which are discussed further below.

When memory access system 50 is in "idle" mode, one input for XOR gate 72 is set at 0 by state machine 76 and one input of XNOR gate 74 is set at 0 by state machine 78. In this configuration, a 0 input (lowest or next highest address request) on bus 52 results in a 0 output from XOR gate 72. AND gate 66 receives this output and provides a low level or 0 output to state machine 76, regardless of the input from AND gate 62, indicating that either the lowest (00 . . . 0) or next highest ($W_{max}$-2) address location, is being requested. At the same time, a 0 input to XNOR gate 74 results in an output of 1 to AND gate 68 indicating the next highest or the lowest page address locations.

On the other hand, when the lowest bit input on bus 52 is 1, XNOR gate 74 provides a low or 0 output to AND gate 68, which in turn provides a 0 output to state machine 78, regardless of the input from AND gate 64, indicating that the highest (11 . . . 1) or next lowest (00 . . . 1) location on a page is being requested. On the other hand, a 1 input to XOR gate 72 provides a 1 output, in the idle state, indicating that either the next lowest or highest page location is being requested.

State machines 76 and 78 each consist of a series of logic elements well known in the art such as AND, OR, NAND, and NOR gates, flip-flops, and latches, which are combined to provide an output to the respective XOR or XNOR gates for use in discriminating between address locations. The details of these machines need not be described here as they are within the skill of those skilled in the art, as well as having a large variety of ways in which they can be implemented including application specific integrated circuits (ASIC), programmable array logic (PAL), or similar devices.

AND gate 66 is only enabled when the input address request MSBs are all 0's (00..0 or 00..1) and disabled otherwise. That is, for address requests other than the two lowest locations, AND gate 66 output is always 0. At the same time, AND gate 68 is only enabled for the two highest page memory locations, where the address request MSBs are all 1's (11..0 or 11..1), and outputs 0 for any other requested address location.

Therefore, if the lowest page location (00..0) is specified on bus 52 during an idle state, XOR gate 72 outputs a 0 and AND gate 66 outputs a zero. This indicates that no action is to be taken, as the prediction cycle is too short before a boundary may be reached, and state machine 76 keeps the system in idle mode. On the other hand, if an address request for the next lowest page location (00..1) is received on bus 52, the output of XOR gate 72 is 1 and so is the output of AND gate 66, since gate 62 output is also 1. This indicates to state machine 76 that the page location nearest but not at the lower page boundary is being requested and a potential underflow condition exists and the system enters the underflow state.

In the underflow state, state machine 76 resets its output to the second XOR gate 72 input to high or 1. Now, only a 0 input (lowest page location) on bus 52 provides a 1 output from XOR gate 72, and from AND gate 66. Otherwise, the output of AND gate 66 is 0. Therefore, after LSB for next memory ac reached, if the LSB for next memory access request is 0 the lowest page position is being requested and 1 is input to state machine 76 by AND gate 66. State machine 76 provides an appropriate predictive response when the second 1 is received from AND gate 66. Otherwise, state machine 76 resets the second input of XOR gate 72 low and waits for the next request for the next lowest page location.

During the time the lowest two memory page locations are being requested, the output from AND gate 68, and the input to state machine 78 are set at 0. However, when one of the two highest page address locations are specified on bus 52, the output of AND gate 66, and input to state machine 76, become 0 while AND gate 68 is enabled and interacts with the output of XNOR gate 74.

In the idle mode, the second input of XNOR gate 74 is set at 0 by state machine 78. Therefore, when the next highest ($W_{max}$-2) page location is requested on bus 52, a 0 is provided to the first input of XNOR gate 74, resulting in an output of 1. AND gate 68 in turn outputs a 1, indicating to state machine 78 that the next highest page location is being requested. At this point, state machine 78 resets the second input of XNOR gate 74 high or 1 and only a request for the highest address location (11 . . . 1), a 1 on bus 52, causes the output of AND gate 68 to be 1 or high. Any other page location request sets the output of AND gate 68 low and state machine 78 returns to an idle state or mode and resets the second input of XNOR gate 74 low.

When the next lowest and lowest page locations are requested in sequence, state machine 76 receives two consecutive inputs of 1 and determines that a potential underflow condition exists, that is one is predicted. Likewise, if the next highest and highest page locations are requested state machine 78 receives two consecutive inputs of 1 and determines that a potential overflow condition exists, that is one is predicted. When either an underflow or overflow condition is predicted by state machines 76 or 78, respectively, they provide a page change signal or strobe to a state machine 80. State machine 80 is constructed from logic elements and components in a similar manner to state machines 76 and 78, as would be known to those skilled in the art.

The page change strobe is used by state machine 80 to indicate that either the next lower or next higher page should be precharged in anticipation of a request from the processor. State machine 80, provides output signals to the computer memory control hardware which requests the next page and activates page refresh or precharging. At the same time, state machine 80 looks for any computer system idle or reset commands to indicate that system 50 should reset to an idle state and avoid a page change for a specified time, as well as whether all other page charge cycles have ended. Therefore, state machine 80, as well as state machines 76 and 78, preferably, is connected to receive input from the processor or other control hardware which indicates that all prior page request activity is terminated, indicated here by the inputs for post advance (POST ADV) and post charge (POST CHG) signals.

In addition to the address request and various gate inputs, the state machines 76, 78, and 80 are also typically connected to observe other signals used within the relevant CPU or processor memory system. Such signals would include a "ready" (RDY) signal to indicate that the processor or CPU is ready to process data, or "burst ready" (BRDY) to indicate that the processor is going to access bursts of data for processing. The last request in a cycle of requests during a period before the processor releases the data bus could be indicated by a "last" signal. Typically these latter functions are only available on more advanced CPUs. In addition, the presence of one or more active high CAS signals, memory being currently column addressed, can be indicated by inputting them to an OR gate 88 whose output is used to indicate column accesses modes to the state machines 76 and 78. That is, whether the data being transferred on the input address bus is valid RAS data or CAS data instead, can be indicated using this logic.

In addition, a global reset command for "all gates" either in the page advance system or linked to the entire computer can be used to reset the state machines in memory access system 50 to their respective idle states. This is seen as an input on a reset bus 82. This reset can be combined with other features, that of a system enable/disable, end of memory addressing shut-down, and excessive page miss inactivation to provide a full reset/inactivation feature set.

An inverted OR or an AND gate 84 receives the page miss and enable/disable inputs. The enable/disable input is typically a signal bit set high to disable the system and low to allow it to operate, although those skilled in the art will readily understand the logic to implement other schemes. This value is conveniently set by a simple register which can be software addressed or controlled by a CPU or using certain predefined BIOS functions. However, where desired, the appropriate register can also be made addressable by higher level software programs and allow commands to disable or enable the system as appropriate for specific program environments. The page miss signal is similarly active high and serves to disable the system where an excessive page "miss" threshold is reached to prevent a penalty in certain operating environments.

At the same time, an input is used to indicate that no more memory access requests or cycles are desired. During this type of operation the system can in fact turn off or at least be set in a long term idle mode or state. The cycle indication signal is generally set high in most CPU systems so an inverter 85 can be conveniently used to invert this signal as desired. The three-input gate 84 then provides a high output when any of the above inputs are high. Using an inverted OR or an AND gate 86, the output of gate 84 can be combined with the reset on bus 82 to reset the memory access system 50 as desired. Those skilled in the art will readily appreciate that additional or alternative logic gate structures can be used to provide the input function for the various rest commands as desired.

To utilize additional levels of prediction, additional low level or LSB bits can be used in conjunction with additional XOR and XNOR gates to distinguish the second or third highest and lowest memory access address locations from the previous two, and each other. Here, depending on the sophistication desired and the minimum steps to be used in the predictive process, additional AND or OR gates may also be employed to distinguish among the addresses as desired. Therefore, state machines 76 and 78 would provide extended idle and overflow or underflow states during which they would predict trends toward the respective underflow and overflow conditions. In turn the state machines would then provide the appropriate strobes to state machine 80 which in turn provides the appropriate next higher or lower page request to the memory control system.

An add/sub strobe section 90 is also shown in FIG. 5 for applying a flag or bit to adder/subtractor element 44, of FIG. 4. This bit indicates to adder/subtractor 44 whether a value of 1 should be added or subtracted from the current address. That is, whether the address should be incremented to the next higher page or decremented to the next lower page. This is typically accomplished using an OR gate 92, and a D type flip-flop 94 as a latch. The output of flip-flop 94 goes high when the strobe output by state machine 78 goes high and is reset to a low state the remainder of the time. Therefore, the normal output from add/sub strobe section 90 indicates a subtraction or decrement to a lower page with an increment being chosen in response to the output of state machine 78. An AND gate 96 and an inverter 98 are used to provide a reset input for the flip-flop 94 using the reset bus 82 and an advance page strobe from the output of state machine 80.

The embodiment described above provides a new technique for improving the effective access time for a given piece of data. That is, the effective speed with which a specific CAS/RAS location is accessed is improved. However, additional effective memory speed for a memory or processor system may be obtained for more advanced processors or memory controllers which use very high speed fixed sequence or burst access modes.

This is accomplished by configuring the memory as a series of interleaved banks. In this configuration, DRAM memory, or the elements and components comprising that memory, is sub-divided into at least two and more banks of interleaved memory. The DRAM memory is sub-divided into "n" banks of memory and data is stored sequentially across the banks. That is, data value X is stored in bank 1, while data X+1 is stored in bank 2, and X+2 in bank 3, and so forth up to the n bank limit before returning to the first bank. At least two banks are used in the DRAM structure (n=2), with four (n=4) providing certain preferred advantages.

Figure 6A:
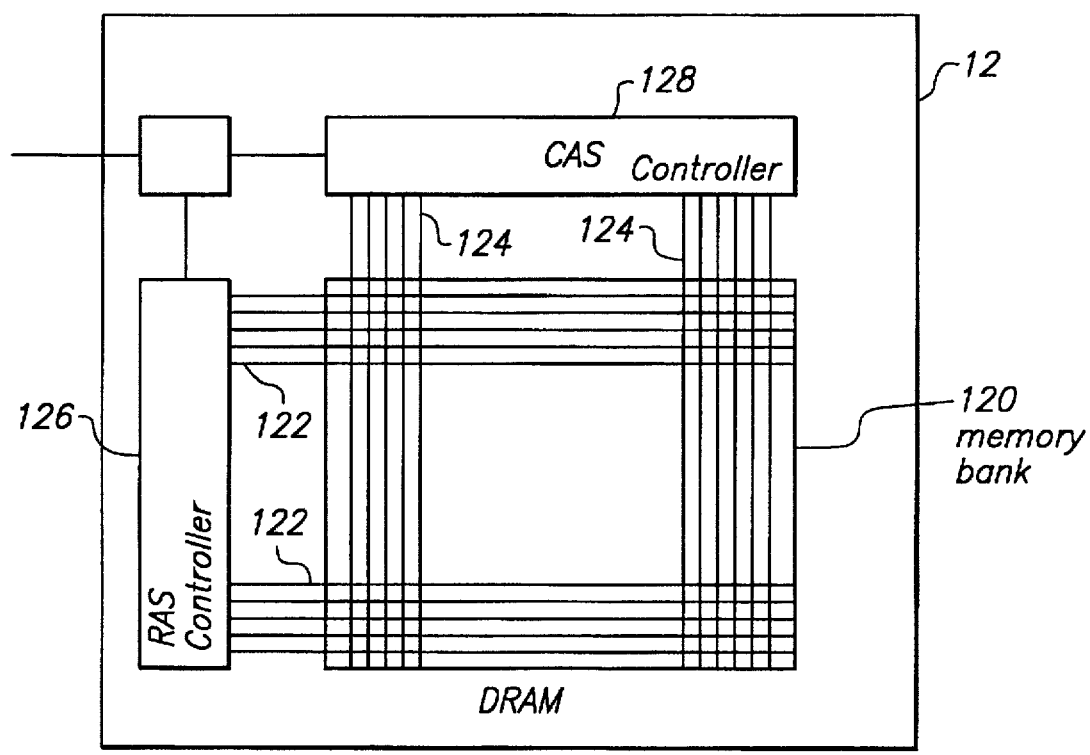
FIG. 6A illustrates a typical memory configuration for implementing the apparatus of FIG. 4.

A typical arrangement for DRAM memory 12 is illustrated in FIG. 6A. In FIG. 6A, DRAM memory 12 uses a single bank of storage locations or elements 120 having a series of rows 122 and columns 124 which are accessed using the appropriate RAS and CAS control circuitry. The structure and operation of the RAS and CAS circuitry is well know to those skilled in the art, and this circuitry is simply illustrated here as conventional address decoder 1000, RAS controller 126 and CAS controller 128. Since RAS and CAS decode logic, Address Line Enable logic, latches, as well as required sensor and amplifier circuits, and other control elements are known in the art, they are not indicated in further detail here. It will be clear to those skilled in the art the apparatus required to implement the invention, and a variety of such apparatus is contemplated within the teachings of the invention.

Figure 6B:
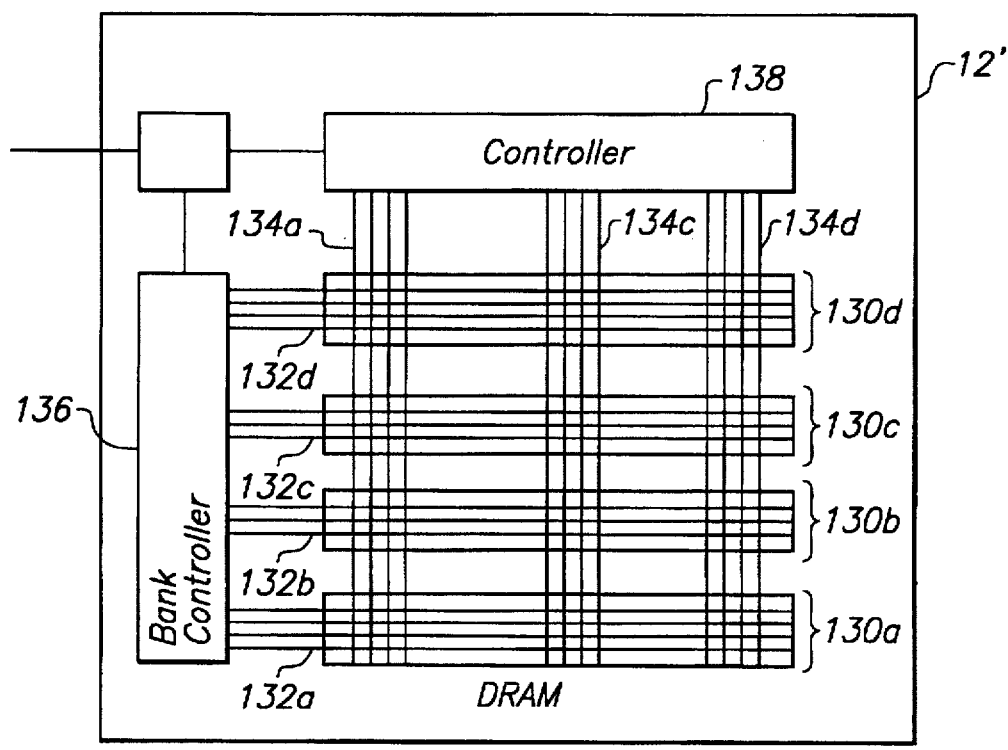
FIG. 6B illustrates an alternative embodiment for a memory configuration for implementing the apparatus of FIG. 4.

The same overall memory structure but configured to use a series of four memory banks is illustrated in FIG. 6B. In FIG. 6B, DRAM memory 12' employs four banks of memory locations 130a, 130b, 130c, 130d, which have a series of rows 132a 132b, 132c, and 132d; and columns 134a, 134b, 134c, and 134d. Appropriate bank control circuitry is connected to the page (row) and column (location) address lines to decode the overall memory addresses into the subdivided individual bank addresses as required. Bank control hardware and systems are known in the electronics art, so this circuitry is simply illustrated as bank controller 136. The individual banks are each designated as being either "even" or "odd". Therefore, banks 130a and 130c (and related rows 132a and 132c) would be odd, while banks 130b and 130d (and related rows 132b and 132d) would be even, or visa versa as desired. This memory is configured so that each time an odd bank is requested, the next even bank is charged, and visa versa.

In the operation of some advanced CPUs internal cache are used to expedite data access and usage, in order to maintain high data through or speed of operation for the CPU. However, when a "miss" is recorded for the data in the cache, the CPU must retrieves the desired data from external memory. As part of the caching operation such CPUs generally retrieve additional data to assure data "hits" for future data requests. That is, once it is found that the right data is not present in the internal cache, the CPU retrieves extra data on the assumption that it may be needed in the near future, a single data-word miss is unlikely. As part of the retrieval process the CPU is configured to retrieve a fixed sequence of data. In the case of some processors a sequence of four data words are retrieved from memory. In a similar manner, a CPU could enter a burst mode of operation in which a longer sequence of data words are transferred (either read or write). At best, a request for n data-words takes at least n access cycles to complete, if the words are on the same memory page. Otherwise, additional cycles are required to precharge and change pages.

The present invention decreases the waiting time otherwise required to reach the first data word by predicting page changes. However, the present invention also takes advantage of the fact that these requests, either cache miss or burst mode, are strictly sequential and also decreases the time to reach subsequent data words in a sequence. Since data is stored across the banks as described above, any sequential data access necessarily proceeds across the banks. Therefore, the banks are charged sequentially so that they are ready for data transfer before the processor requests access.

As an example, if the data is segmented into four banks as shown in FIG. 6B, and the processor is sequentially accessing the banks, then speed is increased by charging the adjacent bank or banks before they are actually being accessed. That is, a "read ahead" process is implemented whereby, as the processor is accessing one bank of memory, the next bank in the series is being prepared. Since the next bank in an access sequence is already fully charged, delays for sequential data access are eliminated. This results in an effective memory access speed for the processor which is faster by a factor slightly less than the number of interleaved banks, here 4. This method of operation is further enhanced by the fact that some processors access data as odd and even data words. That is, the processor is configured to retrieve or transfer larger amounts of data by transferring some data words as an odd input and some as an even input. Therefore, if DRAM memory 130 is further configured to associate the banks of memory as "odd" and "even" and then sequentially charge the even/odd banks as odd/even accesses occur, access speed is increased.

What has been described is a new method and apparatus for providing access addresses in page mode memory in which historical page request information is used to establish predictions of page boundary excursions from trends in page access requests. The page change predictions are then used to precharge appropriate pages prior to requests from a processor, saving time waiting for page charging. At the same time, subsequent, sequential data access or address requests can also be executed faster using a banked DRAM structure with "read ahead" charging. Effective memory access speed is increased by first increasing access by making sure the first word you retrieve is ready, and then assuring that the ensuing data in a sequence is also ready. In addition, enable and disable features allow more efficient application of the inventive apparatus while multiple levels of predictive analysis may provide improved predictions and operation in certain operating environments.

The foregoing description of a preferred embodiment was presented for purposes of illustration and description. It is not intended to be exhaustive nor to limit the invention to the precise form disclosed, and many modifications and variations are possible in light of the above teaching, such as the precise number and type of circuit components or materials used for construction of sequencer 50. In addition, other types of elements can be used to realize the functions of many of the logic elements illustrated in the figures The illustrated embodiment was chosen and described to best explain the principles of the invention and its practical application to thereby enable others skilled in the art to best utilize the invention in various embodiments and with various modifications as are suited to the particular use contemplated. It is intended that the scope of the invention be defined by the claims and their equivalents.

What we claim is:

1. A method for accessing address locations in a paged mode random access memory system, comprising the step of:

detecting when a first page access request specifies a first memory location positioned within a preselected relative distance from a page boundary of a page being accessed;

determining if a consecutive page access request specifies a second memory location closer to the page boundary of the accessed page than the first memory location; and precharging an adjacent page to which the consecutive memory location is closest only when the second memory location is closer to said page boundary than the first memory location, wherein the step of precharging an adjacent page comprises incrementing a page request value by one when the consecutive memory location is closer to an upper page boundary of the accessed page and decrementing the page request value by one when the consecutive memory location is closer to a lower page boundary of the accessed page, and wherein said precharging step comprises the steps of:
storing the page request value for each page access request detected in said detecting step;
summing a value of one to the stored page request value for a current page access request when the current page access request specifies a current memory location closer to the upper page boundary of the accessed page than the first_memory location;
subtracting a value of one from the stored page request value when the current memory location is closer to the lower page boundary of the accessed page than the first memory location; and
providing a revised stored page request value to a page precharging control device.

2. The method of claim 1 further comprising the steps of:
inactivating said detection, determining and precharging steps in response to receiving a disable instruction; and
activating said detection, determining and precharging steps processing in response to receiving an enable instruction.

3. The method of claim 2 further comprising the step of storing desired enable or disable instructions in a software operable register.

4. A method for accessing address locations in a paged mode random access memory system, comprising the steps of:

(A) detecting at least one of:
(1) when a first page access request addresses a first memory location positioned within a first preselected distance below an upper page boundary of a page being accessed; and (2) when the first page access request addresses a second memory location positioned within a second preselected distance above a lower page boundary of the accessed page;

(B) performing steps (B)(1) and (B)(2) when the first page access request addresses the first memory location as detected in said detecting step (A):

(1) determining if a consecutive page access request addresses a third memory location closer to the upper page boundary of the accessed page than the first memory location; and (2) precharging a higher page adjacent to the upper page boundary when the third memory location is closer to the upper page boundary than the first memory location; and (C) performing steps (C)(1) and (C)(2) when the first page access request addresses the second memory location as detected in said detecting step (A):

(1) determining if the consecutive page access request addresses a_fourth memory location closer to the lower page boundary of the accessed page than the second memory location; and (2) precharging a lower page adjacent to the lower page boundary when the fourth memory location is closer to the lower page boundary than the second memory location.

5. The method of claim 4, wherein the first and second preselected distances are equal.

6. A method for accessing memory pages in a computer system implementing paged mode addressing, comprising the steps of:

(A) detecting one of:

(1) when a preselected upper memory location, positioned a preselected relative distance from an upper page boundary, is requested for a page being accessed; and (2) when a preselected lower memory location, positioned a preselected relative distance from a lower page boundary, is requested for a page being accessed;

(B) determining if at least one subsequent memory page access request location is closer to a page boundary for the accessed page than an immediately prior memory page access request location when said detecting step detects access of either preselected memory locations;

(C) predicting one of:

(1) a potential underflow condition when, in said determining step (B), a given subsequent memory page access request location is determined to be closer to the lower page boundary of the accessed page than the immediately prior memory page access request location;

(2) a potential overflow condition when, in said determining step (B), the given subsequent memory page access request location is determined to be closer to the upper page boundary of the accessed page than the immediately prior memory page access request location;

precharging an adjacent lower page when the potential underflow condition is predicted in step (C) 1; and precharging an adjacent upper page when the potential overflow condition is predicted in step (C) (2).

7. The method of claim 6, further comprising the steps of:

accumulating a total number of page hits and page precharge requests for a predetermined time period;

calculating a page hit per precharge request ratio based on said accumulated totals; and selectively disabling the steps of said method when the calculated page hit per precharge request ratio is less than a predetermined threshold value.

8. The method of claim 7, wherein said underflow predicting step (C) (1) comprises predicting an underflow condition when two consecutive memory page access request locations successively approach a lower page boundary; and wherein said overflow predicting step (C) (2) comprises predicting an overflow condition when two consecutive memory page access request locations successively approach an upper page boundary.

9. The method of claim 6, wherein each said preselected location is removed from its respective page boundary by at least two address locations.

10. A method, for accessing address locations in a paged mode random access memory system, comprising the steps of:

detecting when a first page access request specifies a first memory location positioned within a preselected relative distance from a page boundary of a page being accessed;

determining if a consecutive page access request specifies a second memory location closer to the page boundary of the accessed page than the first memory location; and precharging an adjacent page to which the consecutive memory location is closest only when the second memory location is closer to said page boundary than the first memory location, wherein the step of precharging an adjacent page comprises incrementing a page request value by one when the consecutive memory location is closer to an upper page boundary of the accessed page and decrementing the page request value by one when the consecutive memory location is closer to a lower page boundary of the accessed page, and wherein said precharging step comprises the steps of:

storing the page request value for each page access request detected in said detecting step;

summing a value of one to the stored page request value for a current page access request when the current page access request specifies a current memory location successively closer to the upper page boundary of the accessed page than the first and consecutive memory locations;

subtracting a value of one from the stored page request value when the current memory location is successively closer to the lower page boundary of the accessed page than the first and consecutive memory locations; and providing a revised stored page request value to a page precharging control device.

11. An apparatus, for accessing address locations in a paged mode random access memory system, comprising:

a detection circuit in communication with memory to receive paged memory access requests and to detect when a first page access request addresses a first memory location positioned within a predetermined relative distance from a page boundary of a page being accessed, and to detect when a consecutive page access request addresses a second memory location positioned closer to the page boundary of the accessed page than the first memory location;

a prediction circuit in communication with said memory and said detection circuit to determine if the first and second memory locations were consecutively requested; and a page precharge circuit in communication with said memory and said prediction circuit to precharge an adjacent page to which the second memory location is closest only when the second memory location is closer to the page boundary than the first memory location, wherein said detection circuit comprises:

a first gating means for initially detecting any memory page access request addressing the first memory location and any subsequent memory page access request addressing another memory location closer to the page boundary than the first memory location; and a second gating means connected to said first gating means for receiving at least a portion of the memory page access requests and for detecting one of said initially detected access requests, wherein said prediction circuit further comprises a first state machine connected to said second gating means and configured to initially set said second gating means to detect a given memory page access request addressing an upper precharge memory location removed the constant distance from an upper page boundary, and to reset said second gating means to detect only a first subsequent memory page access request addressing a subsequent memory location successively closer to the upper page boundary than the upper precharge memory location, wherein said prediction circuit further comprises a second state machine connected to said second gating means and configured to initially set said second gating means to detect another given memory page access request addressing a lower precharge memory location removed the constant distance from a lower page boundary and to reset said second gating means to detect only a second subsequent memory page access request which is successively closer to the lower page boundary than the lower precharge memory location.

12. The apparatus of claim 11 wherein precharging requests are prevented in the presence of competing memory access activity.

13. The apparatus of claim 11 wherein said first gating means comprises:

at least one multi-input AND gate connected to receive a predetermined number of most significant bits of the memory page access requests; and at least one multi-input NOR gate connected in parallel to receive the predetermined number of most significant bits of the memory page access requests.

14. The apparatus of claim 11 wherein said first gating means comprises:

at least two AND gates connected in parallel and receiving a predetermined number of most significant bits of said memory access requests;

a third AND gate connected to receive an output of said AND gates;

at least two NOR gates also connected in parallel and receiving a portion of said predetermined number of most significant bits of said memory access requests; and a fourth AND gate connected to receive an output of said NOR gates.

15. The apparatus of claim 11 wherein said second gating means comprises:

XOR type gating means for receiving a predetermined number of least significant bits of said memory access requests; and XNOR gate type gating means for receiving said predetermined number of least significant bits of said memory access requests.

16. The apparatus of claim 11, wherein said first and second state machines predict potential overflow and underflow conditions, respectively, and further comprising a third state machine connected to receive predictive outputs from and issue command signals to said first and second state machines and coupled to a paged memory system controller, said third state machine configured to provide requests for page precharging and to interrupt operation of said first and second state machines in response to conflicting page requests from said memory system controller.

17. The apparatus of claim 11 further comprising summation means connected to said precharge circuit and a page memory access controller for adjusting a current request value for a given page by a factor of one in response to an increment/decrement signal from said precharge circuit.

18. The apparatus of claim 11 further comprising:

master reset means for enabling and disabling apparatus operation in response to an operation control signal; and a software addressable control register connected to said master reset means for providing an operation control signal in response to external commands.

19. The apparatus of claim 11, wherein said detection circuit comprises:

a selectable gating circuit to detect one memory address corresponding to a desired predetermined relative distance value from the page boundary; and a gate selector coupled to said selectable gating circuit for storing alternative predetermined relative distance values and selecting the desired relative distance value.

* * * * *

UNITED STATES PATENT AND TRADEMARK OFFICE
CERTIFICATE OF CORRECTION

PATENT NO. : 5,715,421
DATED : February 03, 1998
INVENTOR(S) : James E. Akiyama, et al.

It is certified that error appears in the above-identified patent and that said Letters Patent is hereby corrected as shown below:

Column 18, line 17, change "step" to --steps--.

line 43, delete "_".

line 45, delete "_".

Column 19, line 22, delete "_".

Signed and Sealed this

Fifteenth Day of September, 1998

*Attest:*

BRUCE LEHMAN

*Attesting Officer*   *Commissioner of Patents and Trademarks*